Dec. 13, 1938.  C. CARGILE  2,140,467

THREADED JOINT

Filed Dec. 1, 1937

INVENTOR
Clifton Cargile
BY
ATTORNEY

Patented Dec. 13, 1938

2,140,467

UNITED STATES PATENT OFFICE 2,140,467

THREADED JOINT

Clifton Cargile, Enid, Okla., assignor to The George E. Failing Supply Company, Enid, Okla., a corporation of Oklahoma Application December 1, 1937, Serial No. 177,591

6 Claims. (Cl. 285—146)

This invention relates to threaded joints, particularly those used in pipe connections, rotary tool joints, drill pipe, sucker rods, tubing and similar equipment employed in oil field operations where the joints are subject to accumulations of dust, dirt and drilling fluids. In actual practice these accumulations prevent making a tight joint for the reason that the foreign material is forced between the contact portions of the threads so that it is impossible to obtain the degree of set-up for which the joint was designed. It is also found that the material has been so wedged upon screwing up of the joints that it is extremely difficult at a later time to break the joint. These difficulties are particularly aggravating in rotary drilling operations where the drill pipe and tool joints must be connected and disconnected many times in the drilling process. When the joints are uncoupled the drilling mud flows down the sections of the drill pipe and collects in the spaces between the threads. The collected liquid dries before the joint is recoupled and becomes so hard that it is difficult to dislodge from the threads. This is particularly true of the material lodging between the internal threads of the box ends since the threads are practically inaccessible for cleaning.

It is, therefore, the principal object of the present invention to provide a threaded joint wherein the threads are self-cleaning upon make-up of the joint.

In accomplishing this and other objects of the invention, as hereinafter pointed out, I have provided improved details of structure, the preferred forms of which are illustrated in the accompanying drawing, wherein.

Figure 1:
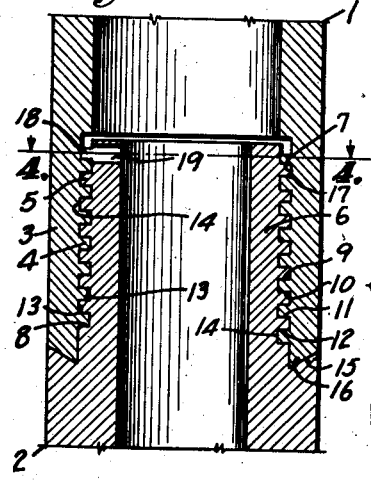
Fig. 1 is a longitudinal section of a threaded joint embodying the features of my invention and showing its application in a drill pipe designed for core drilling operations.

Referring more in detail to the drawing and first to the form of the invention illustrated in Figs. 1 to 4 inclusive:

1 and 2 designate adjoining sections in a string of drill pipe such as used in connection with core drilling rigs for the taking of cores in earth formations, making shot-holes in seismic surveying, and for other drilling operations. The section 1 has a box end 3 provided with internal threads 4 that are formed on the inner surface of the box to engage external threads 5 that are formed circumferentially of a pin 6 on the adjacent end of the section 2. The threads 4 and 5 are illustrated of the square thread type and are in the form of continuous spirals, having spiral spaces 7 and 8 of suitable width so that the side faces 9 and 10 of the threads closely engage the corresponding faces 11 and 12 of the threads 5. The roots 13 of the threads on one section are also of suitable diameter to provide only slight clearance with the crests 14 of the threads on the other section to provide a substantially leak-tight joint and prevent escape of drilling fluid between the threads. In order to further enhance the seal the annular end face 15 of the box is beveled to wedgingly engage a corresponding bevel 16 that is formed circumferentially of the base of the pin 6 on the section 2.

The joint as thus far described is substantially standard for core drilling pipe and tool joints, but when the joints are disconnected as in adding sections of pipe as the drilling progresses, or in pulling of the drilling string, the drill fluid carried in the pipe collects in the spaces between the threads as above pointed out, so that when the joints are reconnected the endmost thread 17 on the pin, when being screwed into engagement with the internal threads of the box, crowds the collected material into the threads at the bottom of the box and it becomes impact to such an extent that it is difficult to bring the seating surfaces 15 and 16 of the respective sections into sealing engagement. The pressures acting upon the foreign material force particles thereof into the clearance spaces between the threads to hold them apart and any granular material tends to wedge in and score the surfaces of the threads to further interfere with make-up of the joint. When the joint is to be again disconnected the highly compacted material and granular substances are so wedged between the surfaces of the threads that it is difficult and often impossible to disconnect the joint with conventional equipment.

Figure 2:
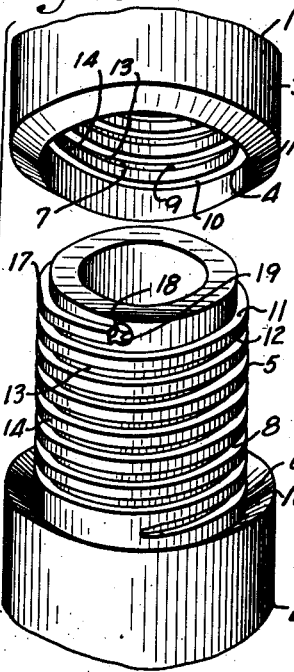
Fig. 2 is a detail perspective view of the pin and box members of the joint shown in disassembled spaced relation.
Figure 3:
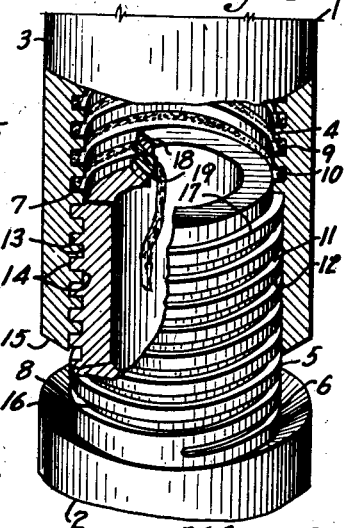
Fig. 3 is a perspective view of the joint with the pin and box members partly in section to illustrate dislodgment of foreign material from the internal threads of the box incidental to make-up of the joint.
Figure 4:
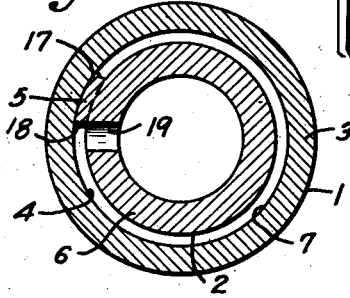
Fig. 4 is a horizontal section through the joint on the line 4—4 of Fig. 1.

By the present invention I have overcome these difficulties by providing a substantially square or blunt face 18 on the terminal 17 of the thread 5 so that as the terminal of the thread enters the space between the internal threads of the box the foreign material is scraped from the threads and pushed thereahead for extrusion through a release opening 19 that is drilled radially through the wall of the pin directly at the terminal end of the thread, as clearly shown in Fig. 2. Thus as the pin is tightened in the box the extraneous material is dislodged and moved through the opening 19 into the interior of the drill pipe so that joint may be completely drawn up. The relief opening 19 not only provides for escape of the material but prevents back pressure which tends to force the material between the surfaces of the threads, consequently, when the joint is made up the threads are clean and in metal to metal contact to provide a leak-proof joint. Since the threads are free of accumulating material the joint may be readily disconnected with the customary tools and with minimum effort upon the part of the operators.

Figure 5:
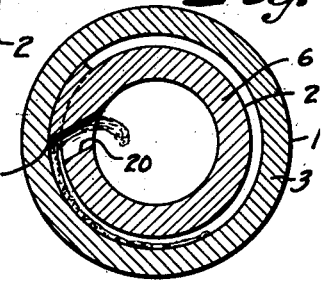
Fig. 5 is a similar section through a modified form of the invention.

In the form of the invention illustrated in Fig. 5, the relief opening 20 and the end face 21 of the thread are on a tangent to possibly provide a better scraping action and easier relief of the material, however, the operation of the invention is substantially that described in connection with the preferred form.

Figure 6:
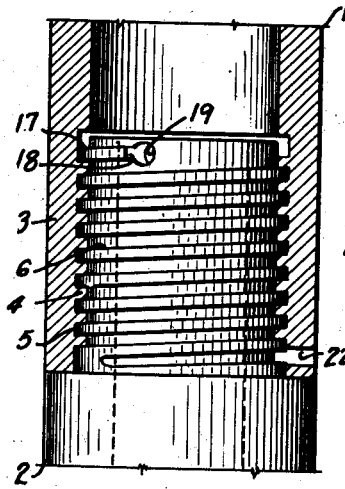
Fig. 6 illustrates a further modification of the invention as applied for cleaning the external threads of the pin member.

In Fig. 6 the end of the box is provided with a relief opening 22 that extends through the wall thereof to provide relief of any material that collects upon the surfaces of the pin threads.

Figure 7:
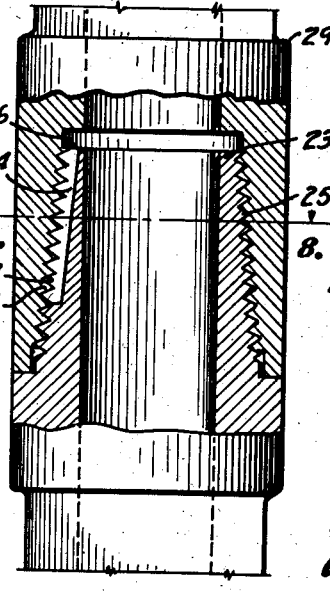
Fig. 7 shows an adaptation of the invention to a standard tapered rotary tool joint for connecting the sections of drill pipe.
Figure 8:
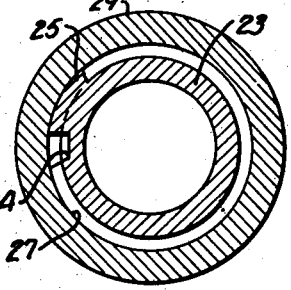
Fig. 8 is a horizontal section on the line 8—8 of Fig. 7.

In Fig. 7 is illustrated an adaptation of the invention to a standard tapered tool joint for drill pipe wherein the tapered pin 23 is provided with a longitudinal groove 24 extending transversely of the threads 25 and which terminates at the end 26 of the pin. The sides of the groove form scraping portions at the threads which are comparable to the end face 18 in the first form of the invention so as to remove accumulations from the spaces 27 between the internal threads 28 that are formed in the box section 29 of the joint. As the pin is threaded into the box the foreign material removed is extruded longitudinally of the groove and discharged from the end thereof into the interior of the pipe, with the result that the threads are free of accumulated foreign material when the joint is completely tightened.

From the foregoing it is obvious that while the invention may appear to be a simple solution of the difficulties heretofore encountered, it is an important one inasmuch as it insures completely tight, leak-proof joints and facilitates breaking of the joints when they are to be disconnected in drilling practices.

What I claim and desire to secure by Letters Patent is:

1. In a device of the character described, a pair of tubular members having interengaging threaded walls with the thread on one of said members terminating short of the end of said member to provide a scraping face arranged at an angle transverse to the direction of rotation when connecting said members for dislodging accumulated material from between the threads of the other member, said member having the scraping face being provided with an opening extending completely through the wall thereof wherethrough the dislodged material is extruded and diverted away from any interengaging surfaces of said members.

2. In a device of the character described, a pair of tubular members having interengaging walls provided with substantially square threads with the thread on one of said members terminating short of the end of said member to provide a scraping face conforming in shape to the cross-section between the threads of the other member and arranged at an angle transverse to the direction of rotation when connecting said members for directly dislodging accumulations between the threads of the other member, said member having the scraping face being provided with an opening extending therethrough at the terminal end of said thread wherethrough the dislodged material is extruded into the interior of said tubular members and diverted away from any interengaging surfaces of said members incidental to connection thereof.

3. In a device of the character described, a pair of tubular members having interengaging walls provided with substantially square threads with the thread on one of said members terminating short of the end of said member to provide a scraping face conforming in shape to the cross-section between the threads of the other member and arranged at an angle transverse to the direction of rotation when connecting said members for directly dislodging accumulations between the threads of the other member, said member having the scraping face being provided with an opening extending therethrough at the terminal end of said thread wherethrough the dislodged material is extruded into the interior of said tubular members and diverted away from any interengaging surfaces of said members incidental to connection thereof, said face and opening being arranged substantially tangential with the inner surface of said member whereby the dislodged material is diverted away from any interengaging surfaces of said members.

4. In a device of the character described, a pair of tubular members having pin and box ends provided with interengaging threads with the thread on the pin terminating short of the end of the pin, said end of the thread forming a scraping face arranged at an angle transverse to the direction of rotation when connecting said members for dislodging material from between the threads of the box, said pin having an opening located beyond the terminal end of said thread and extending through the wall of said pin wherethrough the dislodged material is extruded into the interior of the pin and away from said box incidental to threading of the pin into the box.

5. In a device of the character described, a pair of tubular members having pin and box ends provided with interengaging threads, said member having the pin being provided with an annular shoulder for abutting engagement with the end of the box, the thread in said box terminating short of said end to provide a scraping face arranged at an angle transverse to direction of rotation when connecting said members for dislodging accumulated material from between the threads of said pin, said box having an opening extending through the wall thereof at the base of said scraping face whereby the dislodged material is diverted through said opening and away from said shoulder.

6. In a device of the character described, a pair of tubular members having pin and box ends provided with interengaging threads with said threads respectively terminating short of the outer end of the pin and the end of the box to provide scraping faces arranged at angles transverse to the direction of rotation when connecting said members for dislodging accumulated material between said threads, said pin and box having openings located at the bases of said scraping faces and extending through the walls thereof whereby the material dislodged from between threads on the pin is diverted exteriorly of said members and the material dislodged from between the threads on the box is diverted into the interior of said members and away from any interengaging surfaces of said members.

CLIFTON CARGILE.